United States Patent
Diau et al.

(10) Patent No.: US 9,349,540 B2
(45) Date of Patent: May 24, 2016

(54) METHOD FOR MANUFACTURING PLATINUM NANOPARTICLE SOLUTION AND SELF-ASSEMBLED PLATINUM COUNTER ELECTRODE THEREOF

(71) Applicant: National Chiao Tung University, Hsinchu (TW)

(72) Inventors: Eric Wei-Guang Diau, Taipei (TW); Chia-Hung Tsai, New Taipei (TW); Lu-Lin Li, New Taipei (TW); Hsin-Hui Wu, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 10 days.

(21) Appl. No.: 14/329,238

(22) Filed: Jul. 11, 2014

(65) Prior Publication Data
US 2015/0287541 A1 Oct. 8, 2015

(30) Foreign Application Priority Data
Apr. 3, 2014 (TW) .................................. 103112479

(51) Int. Cl.
*B01J 23/42* (2006.01)
*B01J 37/00* (2006.01)
(Continued)

(52) U.S. Cl.
CPC ............. *H01G 9/2022* (2013.01); *Y02E 10/542* (2013.01)

(58) Field of Classification Search
CPC ........ B01J 23/42; B01J 35/0033; B01J 37/00; B01J 37/0072; B01J 37/08; H01M 4/88; H01M 4/8817; H01M 4/8825; H01M 4/9058; H01M 4/9091; H01M 4/92; H01M 4/928
USPC .................................................. 502/101, 339
See application file for complete search history.

(56) References Cited

U.S. PATENT DOCUMENTS 7,381,682 B1 * 6/2008 Jia .................... B01D 53/864
                                                    502/327
7,589,043 B2 * 9/2009 Yoo .......................... B01J 23/38
                                                    428/403
(Continued)

FOREIGN PATENT DOCUMENTS

WO       2015/016773       *  2/2015   ............... B01J 23/38

OTHER PUBLICATIONS

"Catalytic platinum layers for dye solar cells: A comparative study," Guram Khelashvili et al. Thin Solid Films 511-512 (2006), pp. 342-348.*

(Continued)

*Primary Examiner* — Patricia L Hailey
(74) *Attorney, Agent, or Firm* — Muncy, Geissler, Olds & Lowe, P.C.

(57) ABSTRACT

The present invention provides a method for manufacturing platinum nanoparticle solution and a self-assembled platinum counter electrode thereof. The present invention adopts a polyol reduction method and controls the reduction reaction periods under various pH conditions. After the platinum nanoparticle dispersion solution of uniformly distributed platinum nanoparticles having small sizes is produced, the self-assembled platinum nanoparticles are adsorbed on a functionalized surface of a conductive substrate by dip coating at the normal temperature. Therefore, the structure of a platinum nanoparticle monolayer is formed, to obtain the self-assembled platinum counter electrode with a homogeneous single layer on the surface. This process is much simpler without adding any stabilizers or surfactants, without involving any subsequent heat treatments, and it consumes less amount of the platinum material. By employing the present invention for commercialization, the cost of mass production for the dye-sensitized solar cell application is thus reduced.

12 Claims, 9 Drawing Sheets

(51) Int. Cl.
*B01J 37/08* (2006.01)
*H01G 9/20* (2006.01)

(56) References Cited

U.S. PATENT DOCUMENTS

| | | | | |
|---|---|---|---|---|
| 8,367,266 | B2* | 2/2013 | Harkness | B82Y 30/00 420/461 |
| 2007/0034052 | A1* | 2/2007 | Vanheusden | B22F 1/0018 75/362 |
| 2007/0270305 | A1* | 11/2007 | Pak | H01M 4/8657 502/172 |
| 2007/0289409 | A1* | 12/2007 | Xia | B22F 1/0025 75/370 |
| 2008/0050641 | A1* | 2/2008 | Dressick | B01J 31/1616 502/150 |
| 2008/0051281 | A1* | 2/2008 | Dressick | H01M 4/8807 502/101 |
| 2009/0084678 | A1* | 4/2009 | Joshi | A61B 5/14532 204/403.14 |

OTHER PUBLICATIONS

"Rol of the Platinum Nanoclusters in the Iodide/Triiodide Redox System of Dye Solar Cells," Helmut Bonnemann et al. Journal of Cluster Science, Mar. 2007, vol. 8, Issue 1, pp. 141-155.*

Calogero, G., et al. "A new type of transparent and low cost counter-electrode based on platinum nanoparticles for dye-sensitized solar cells." Energy Environ. Sci. 4, pp. 1838-1844(2011).

Wang, Y., et al., "Transparent flexible Pt counter electrodes for high performance dye-sensitized solar cells.", J. Mater. Chem. 22, pp. 22155-22159 (2012).

Wei et al., "Immobilization of poly(N-vinyl-2-pyrrolidone)-capped platinum nanoclusters on indium-tin oxide glass and its application in dye-sensitized solar cells.", J. Phys. Chem. C 111, pp. 4847-4853 (2007).

Cho et al., "Attachment of Platinum Nanoparticles to Substrates by Coating and Polyol Reduction of A Platinum Precursor.", J. Phys. Chem. C 115, pp. 8519-8526, (2011).

Sun et al., "Nanostructured Platinum Films Deposited by Polyol Reduction of a Platinum Precursor and Their Application as Counter Electrode of Dye-Sensitized Solar Cells.", J. Phys. Chem. C 114, pp. 4237-4244, (2010).

Pavlovic et al., "Surface Functionalization of Silicon Oxide at Room Temperature and Atmospheric Pressure.", J. Colloid Interface Sci. 254, pp. 200-203, (2002).

Xia et al., "Shape-Controlled Synthesis of Metal Nanocrystals: Simple Chemistry Meets Complex Physics?", Angew. Chem., Int. Ed. 48, pp. 60-103, (2009).

Chen et al., "Polyol Synthesis of Platinum Nanostructures: Control of Morphology through the Manipulation of Reduction Kinetics.", Angew. Chem., Int. Ed. 44, pp. 2589-2592, (2005).

Herricks et al., "Polyol Synthesis of Platinum Nanoparticles: Control of Morphology with Sodium Nitrate.", Nano Lett. 4, pp. 2367-2371, (2004).

Li et al"Low-Temperature Nanofabrication of Uniform Self-assembled Platinum Monolayers for Dye-sensitized Solar Cells", 2014, 29 pages, http://diau08.ac.nctu.edu.tw/publication/2014/SAM-Pt_text_all.pdf.

Päivi Mäki-Arvela, et al., "Effect of catalyst synthesis parameters on the metal particle size", Applied Catalysis A: General, vol. 451, 2013 pp. 251-281.

* cited by examiner

METHOD FOR MANUFACTURING PLATINUM NANOPARTICLE SOLUTION AND SELF-ASSEMBLED PLATINUM COUNTER ELECTRODE THEREOF

This application claims priority for Taiwan patent application no. 103112479 filed at Apr. 3, 2014, the content of which is incorporated by reference in its entirely.

BACKGROUND OF THE INVENTION

1. Field of the Invention

The present invention relates to a manufacturing method for platinum counter electrode applicable to dye-sensitized solar cells (DSSC), and more particularly to a method that comprises polyol reduction to fabricate platinum nanoparticle solution first and dip-coating a conductive substrate in the solution at low temperature thereof to manufacture a self-assembled platinum counter electrode.

2. Description of the Prior Art

Dye-sensitized solar cells (DSSC) are promising devices for energy conversion to generate clean renewable energy and to diminish emissions of greenhouse gases with the advantages of low cost, simple processing and efficient performance. Overall, platinum electrode is considered to be the most promising component to give record device efficiency of power conversion because of its great catalytic activity. However, since pure platinum is very expensive, alternative materials, for example, platinized counter electrode (CE) formed on a substrate that is advantageous of being easily made and adopted to afford mass production are thus proposed nowadays in order to replace the pure platinum electrode so as to save the production cost and become widely used in the market.

In tradition, to prepare a thin layer of platinum on a transparent conducting oxide (TCO) substrate as CE, several strategies including thermal deposition (TD), sputtering deposition (SD), and chemical reduction method have been applied. However, TD requires subsequent annealing at a high temperature such as 385° C., which makes it infeasible for flexible devices; SD requires processing under an ultrahigh vacuum condition with much Pt wasted in the chamber, which makes it unfavorable for mass production. Chemical reduction must be in process of adequate stabilizer involved, such as polyvinyl pyrrolidone (PVP) or other surfactant or protective agent in order to stabilize the reduction kinetics and lower its reaction rate such that no particle aggregation will be formed. Although the use of stabilizer may result in less consumption of precious metal, nevertheless, additional post-heating steps must be utilized to remove these stabilizers which may be attached to a surface of the electrode substrate, such that metal particles can be adhesive to the electrode substrate more tightly without any stabilizers in between, and the conventional issues that series resistance may go up and power efficiency may be lowered will be avoided. However, it shall be noticed that after the post-heating steps are adopted, a distribution of Pt nanostructure is not formed homogeneously and uniformly, but aggregated to form a plurality of islands, which may cause a huge waste of precious metal, thereby resulting in high production cost. Meanwhile, the post-heating treatment is not only time and money consuming, but also inapplicable to mechanical rigidity (adhesive strength) to improve the enduring stability, especially for flexible devices. On account of above, it should be obvious that there is indeed an urgent need for the professionals in the field for a new manufacturing method to be developed that can effectively solve those above mentioned problem occurring in the prior design.

SUMMARY OF THE INVENTION

In order to overcome the above-mentioned disadvantages, one major objective in accordance with the present invention is provided for a method for manufacturing platinum nanoparticle solution and self-assembled platinum counter electrode thereof. By simply utilizing a quite mild method, which is a polyol reduction method, the present invention can control the rate for the reduction reaction merely under varied pH conditions without using any stabilizer which was needed in the prior arts. Therefore, a dispersive solution containing small-sized platinum nanoparticles with uniform size distribution is fabricated. Afterwards, by dip coating a conductive substrate in the solution at normal temperature, the self-assembled platinum nanoparticles are adsorbed on a clean surface of the substrate to form a monolayer of platinum nanoparticles and obtain the self-assembled platinum counter electrode with a homogeneous single layer on the surface. The method of the present invention is beneficial to be applicable to the use for DSSC and, as required for commercialization also suitable for many other energy-related applications such as fuel cells that require platinum as an efficient catalyst to expedite the oxygen reduction reactions (ORR).

For achieving the above mentioned objectives, the present invention provides a method for manufacturing platinum nanoparticle solution. The method is involved with polyol reduction, which utilizes ethylene glycol (EG) to dissolve $H_2PtCl_6$ and create the $H_2PtCl_6$/EG polyol solution as precursor. The solution is then gradually heated to 100-120° C. and with the reduction periods of 2~5 hours. Meanwhile, by adding NaOH to adjust pH condition of the solution, the reduction kinetics can be well controlled. When the pH condition of the polyol solution is adjusted between 2.7 and 4.9, an ideal platinum nanoparticle solution of the present invention is formed, which is composed of homogeneously and uniformly distributed Pt nanoparticles, performing great stability and showing no aggregation.

On the other hand, the present invention further provides a method for manufacturing a self-assembled platinum counter electrode. The self-assembled platinum counter electrode is fabricated by dip coating a conductive substrate whose surface had been functionalized and modified beforehand, into the previously disclosed platinum nanoparticle solution under normal temperatures. By doing so, a monolayer of small-size platinum nanoparticles are adsorbed and uniformly distributed on the surface of the conductive substrate and the self-assembled platinum counter electrode with a homogeneous single layer on the surface is formed.

On the contrary, since stabilizer was a must in the prior design method, the reactive efficiency will accordingly be affected and decreased due to the stabilizer/residues remaining in the dispersive Pt solution. As a result, since the self-assembled platinum monolayer (SAM-Pt) surface of the platinum counter electrode is clean and surfactant-free, the present invention can be effectively used to solve the prior issue when stabilizer had to be used, and thus to activate the iodine reduction reaction (IRR) activity which converts the triiodide anions ($I_3^-$) into iodide anions ($I^-$) at the CE/electrolyte interface to provide sufficient $I^-$ species to regenerate the oxidized dye molecules. Moreover, since the Pt loading in the self-assembled platinum counter electrode of the present invention is minimized and no subsequent annealing steps need to be used, the present invention is beneficial to save production cost and to show a great potential for DSSC commercialization.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
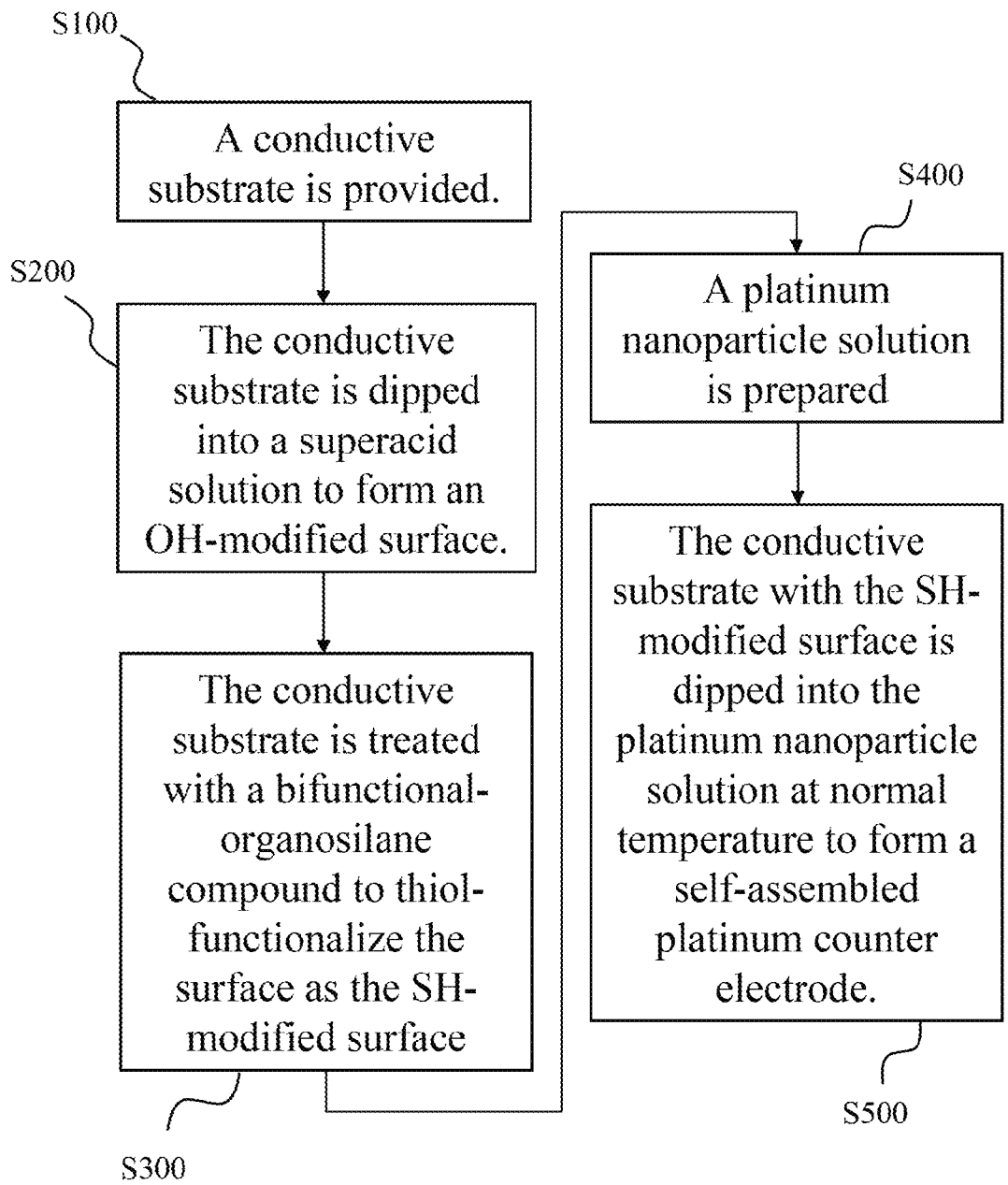
FIG. 1 shows a flow chart of manufacturing method for self-assembled platinum counter electrode in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The present invention discloses a method for manufacturing platinum nanoparticle solution and self-assembled platinum counter electrode thereof, which adopts a polyol reduction method under varied pH conditions to control its rate for the reduction reaction, and records how the reaction goes by simply measuring pH and UV/Visible absorption spectra of the polyol solution. The present invention successfully provides an effective manufacturing method for the dispersion solution containing platinum nanoparticles having the best and most uniformly distributed platinum nanoparticles ever. Afterwards, the self-assembled platinum nanoparticles are adsorbed on a functionalized surface of a conductive substrate by dip coating at the normal temperature so as to form a monolayer of platinum nanoparticles and obtain the self-assembled platinum counter electrode with a homogeneous single layer on the surface. Since the manufacturing method of the present invention is not involved with any stabilizers, protective agents or surfactants, subsequent heat treatments are unnecessary. It is therefore beneficial to maintain a large active surface for great catalytic activity and as a result can be used to show extraordinary photovoltaic and electrochemical characteristics compared to the prior arts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Please refer to FIG. 1, which shows a flow chart of manufacturing method for self-assembled platinum counter electrode in accordance with one embodiment of the present invention. As shown in FIG. 1, the manufacturing method comprises steps of S100, S200, S300, S400 and S500. In S100, a conductive substrate, for example, a glass substrate or a flexible plastic substrate is provided. The glass substrate may be Fluorine-doped tin oxide (FTO)—glass. The flexible plastic substrate may be Indium Tin Oxide-PEN (ITO-PEN) or Indium Tin Oxide-PET (ITO-PET). S200 and S300 are then performed to functionalize and modify a surface of the conductive substrate. At the step of S200, a superacid solution made of $H_2SO_4$:$H_2O_2$=4:1 as Carro's acid or Piranha etch is provided. The conductive substrate is dipped into the superacid solution for 3 minutes. Later, deionized water is applied to wash the surface of the conductive substrate and a nitrogen gun is then applied to dry the surface. In general, the step S200 makes the surface of the conductive substrate more hydrophilic such that the surface can be covered with an active hydroxyl group (—OH) to show an OH-modified surface. By measuring the contact angles of water on the conductive substrate, it apparently shows that the contact angles decrease because of an increased hydrophilic property of the surface after the active hydroxyl group (—OH) grows. In one embodiment, the step S200 is optional when the conductive substrate is a flexible conductive plastic substrate.

Next, in the step of S300, the hydrophilic substrate is treated with a bifunctional-organosilane compound of which one side contains a functional group such as —$NH_2$, —SH, —OH or —COOH, and the other side contains a Si—O—Si bond to form a densely packed silane SAM on the surface of the conductive substrate. According to the embodiment of the present invention, the OH-modified substrate in S200 is then dipped into a solution containing 3-mercaptopropyl (trimethoxysilane) (MPTMS, 0.56 M) in ethanol at 295 K for one hour. Later, those MPTMS molecules which are not attached to the substrate will be washed away and a nitrogen gun is applied again to dry the surface. At the step of S300, a thiol-functionalized silane SAM film on the substrate is created. After this treatment, the contact angle of water on the conductive surface increases because of a decreased hydrophilic property of the surface since the thiol-funtionalized (SH-modified) substrate is formed, which in turn confirms the formation of a dense MPTMS monolayer successfully formed on the conductive substrate.

Figure 2:
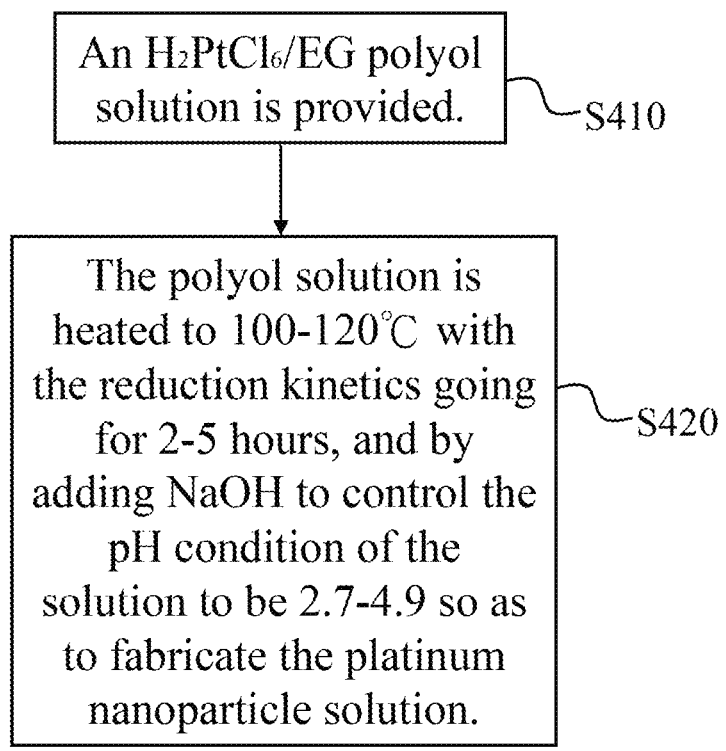
FIG. 2 shows a flow chart of manufacturing method for platinum nanoparticle solution in accordance with one embodiment of the present invention.

As for the following step of S400, please refer to FIG. 2, which shows a flow chart of manufacturing method for platinum nanoparticle solution in accordance with one embodiment of the present invention. According to the embodiment of the present invention, the manufacturing method adopts a polyol reduction method under varied pH conditions to control its rate for the reduction reaction without using any stabilizers, and the method comprises steps of S410 and S420. In S410, ethylene glycol (EG) is provided and used in the polyol approach to serve as not only a solvent to dissolve $H_2PtCl_6$ but also a gentle reducing agent to produce the required Pt nanoparticles (NP) with uniform size. Therefore, an $H_2PtCl_6$/EG solution is formed in the step of S410. Next, in the step of S420, the $H_2PtCl_6$/EG solution, as precursor, is gradually heated to 100~120° C. (most preferable at 110 ° C.) under Argon gas and with the reduction kinetics going for 2-5 hours (most preferable for 4 hours) controlled in a process of adding $6.23 \times 10^{-2}$ M NaOH/EG solution. By adding NaOH/EG solution and adjusting pH condition of the $H_2PtCl_6$/EG solution, the rate of the reduction kinetics can be well controlled. UV/Visible absorption spectra of the polyol solution are provided later to record and prove how the reduction reaction goes. According to the embodiment of the present invention, when the pH condition of the $H_2PtCl_6$/EG solution is adjusted between 2.7 to 4.9, the reduction rate of $H_2PtCl_6$ can be effectively retarded under high pH conditions. Overall, when the pH value reaches nearly 3.7 which is the optimum condition for the reduction reaction, a mono-dispersed platinum NP solution with the particle sizes smaller than 3 nm and uniformly distributed in the EG solution is thus obtained. According to the present invention, the Pt nanoparticles in the dispersion solution of the embodiment can be separate for more than one month, showing no aggregation and meanwhile providing high repeatability in use.

Finally, after the platinum nanoparticle dispersion solution containing uniformly distributed platinum nanoparticles with small particle sizes is prepared, the conductive substrate with its thiol-funtionalized (SH-modified) surface is dipped into the platinum nanoparticle dispersion solution at normal temperature (e.g. at 295 K) as shown in the step of S500. As a result, the self-assembled platinum nanoparticles are adsorbed on the functionalized surface of the conductive substrate to form a monolayer of platinum nanoparticles. After 8-24 hours (most preferable, 15 hours) of dipping, pure EG solvent is applied to rinse the substrate to ensure formation of monolayer of platinum nanoparticles on the surface. Therefore, a self-assembled platinum counter electrode with a homogeneous single layer on the clean surface is obtained.

According to the embodiment of the present invention, the key to produce a clean surfactant-free self-assembled platinum monolayer (SAM-Pt) surface with enhanced iodine reduction reaction (IRR) activity is to control the size of the Pt NP with sufficient uniformity in the polyol solution. In the present invention, the pH of the $H_2PtCl_6$/EG solution is adjusted in a range of 1.5-5.6 to control the formation of Pt NP and to avoid the aggregation of Pt NP in the solution. Specifically, the $H_2PtCl_6$/EG solution, as precursor is provided to have a concentration at 5 mM and a volume of 3 ml; NaOH/EG solution having a concentration of $6.23 \times 10^{-2}$ M and a volume of x ml is added to adjust pH of the $H_2PtCl_6$/EG solution; and a volume of (27-x) ml EG is added finally to produce a reactive solution with a final volume 30 ml. As x increases in a range from 0, 1.2, 1.5, 1.8, 3 to 3.75, the pH value of the reactive solution will vary from 1.5 (no NaOH is added), 2.0, 2.7, 3.7, 4.9 to 5.6.

Figure 3A:
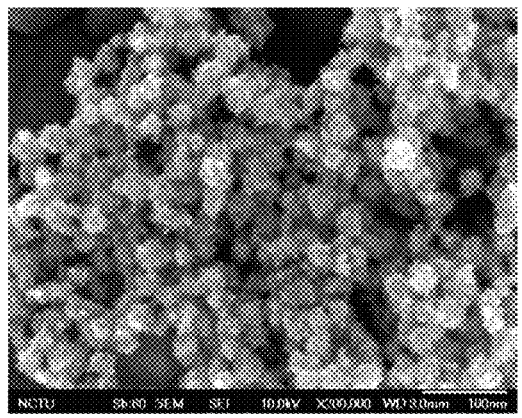
FIGS. 3A-3F show the surface morphologies observed by Scanning Electron Microscope (SEM) of the TCO substrates decorated with Pt NP solutions prepared at pH 1.5, 2.0, 2.7, 3.7, 4.9 and 5.6, respectively.
Figure 3B:
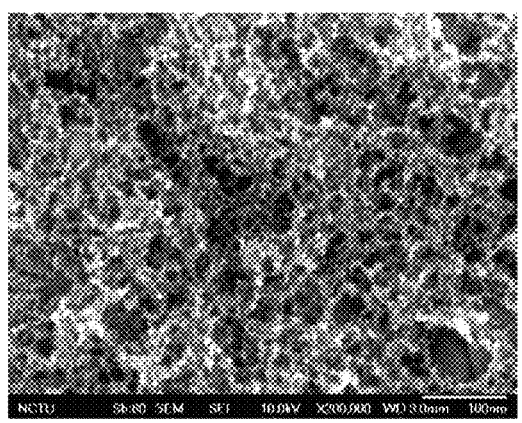
Figure 3C:
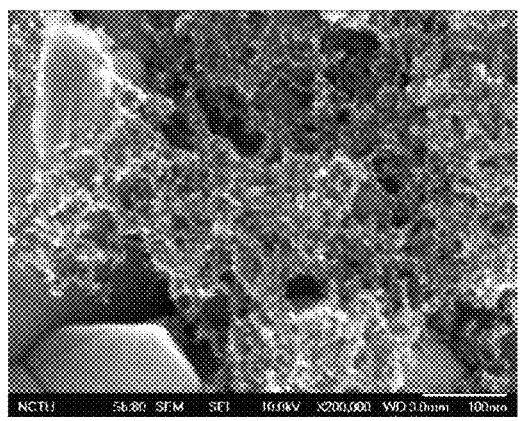
Figure 3D:
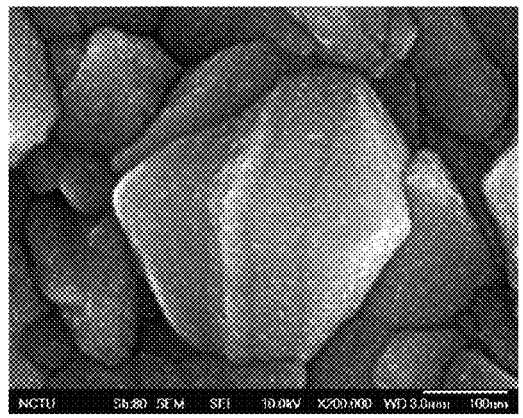
Figure 3E:
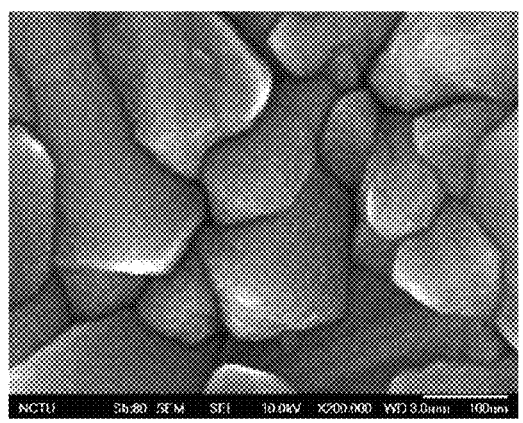
Figure 3F:
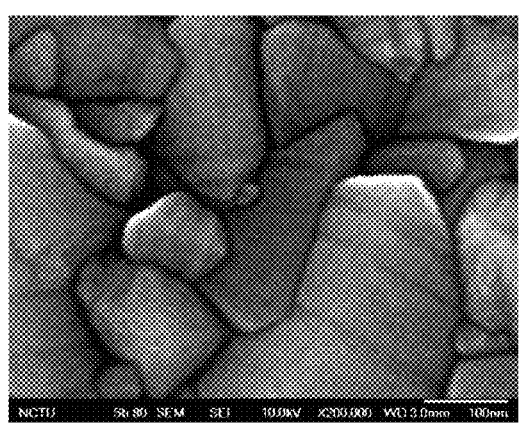
Figure 4:
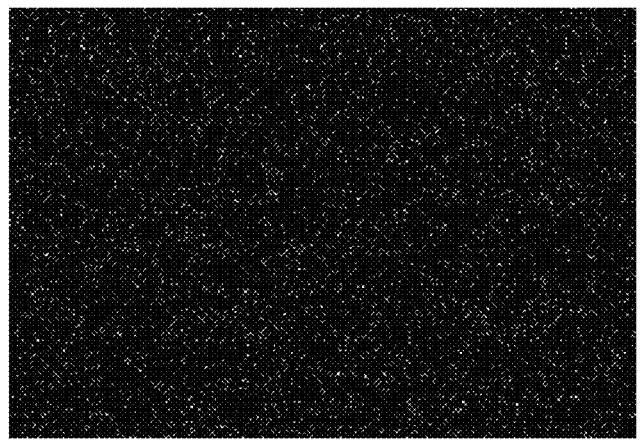
FIG. 4 shows an EDS mapping image of elemental Pt in accordance with one embodiment of the present invention.
Figure 5:
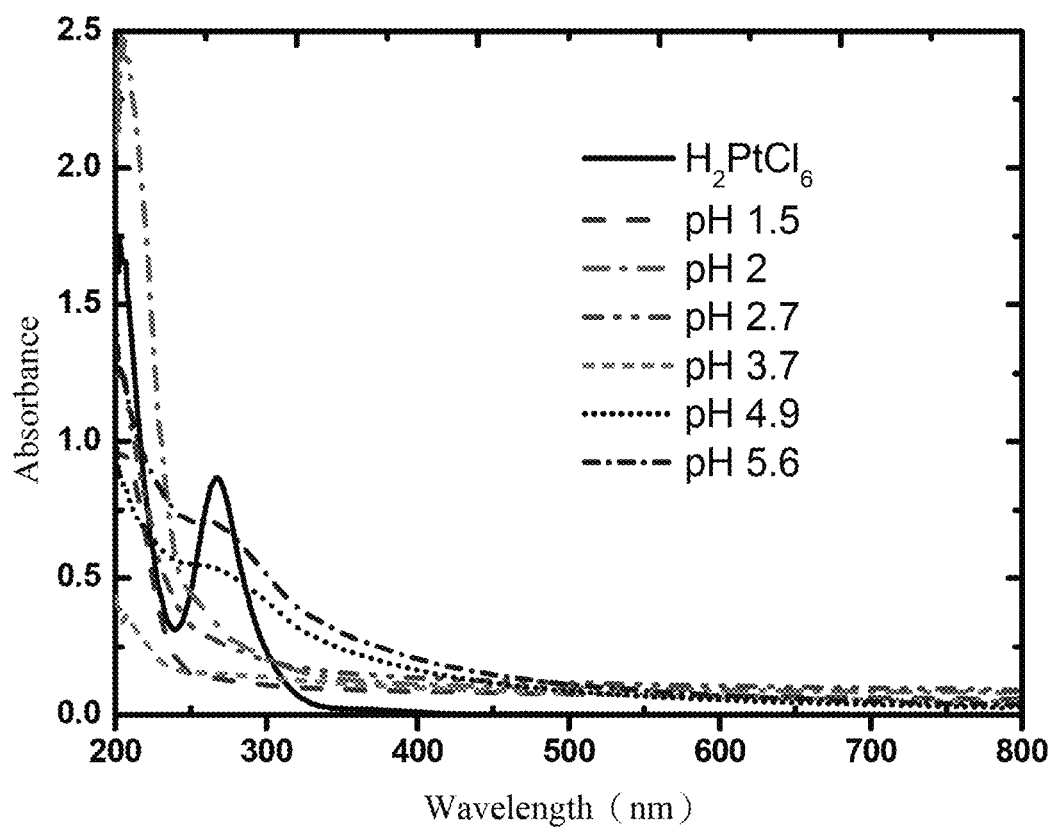
FIG. 5 shows UV/Visible absorption spectra of the polyol reactive solutions under varied pH conditions as 1.5, 2.0, 2.7, 3.7, 4.9 and 5.6, respectively.

Please refer to FIGS. 3A-3F, which show the surface morphologies observed by Scanning Electron Microscope (SEM) of the TCO substrates decorated with Pt NP solutions prepared at pH 1.5, 2.0, 2.7, 3.7, 4.9 and 5.6, respectively. By analyzing the experimental results, it is obvious that the pH of the solution plays an important role to control both the formation and the size of Pt NP and to avoid the aggregation of Pt NP in the solution. The effect of pH on formation of Pt NP was easily observed and confirmed with these FIGS. 3A-3F. For example, as shown in FIG. 3A, at pH without added base, the $Pt^{IV}$ species was rapidly reduced to $Pt^0$, and an uniform growth of crystals was difficult to generate in that condition. As a result, irregular nanoclusters formed through agglomeration of Pt NP with uneven coverage on the surface of the TCO substrate. As for FIG. 3B, at pH 2.0, the Pt nanoclusters became smaller and aggregated to form a branch-like structure; the size distribution and the surface coverage were, however, still poor. When pH was increased to 2.7 as shown in FIG. 3C, the Pt nanoparticles started to behave more stable. When the pH was further increased to 3.7 as shown in FIG. 3D, an uniform morphology of Pt NP with particle size less than 10 nm was observed, which is consistent with the EDS mapping image of elemental Pt (FIG. 4) showing a well dispersed coverage of SAM-Pt on the TCO surface. As the pH was increased to 4.9 and 5.6, the formation of Pt NP on TCO was scarcely observable in the SEM images (FIG. 3E and FIG. 3F), because the reduction rate became very slow with NaOH at such a large concentration. The effect of pH on formation of Pt NP can also be observed and confirmed from FIG. 5, which shows UV/Visible absorption spectra of the polyol reactive solutions under varied pH conditions as previously indicated. The kinetics of the reduction is complete when the absorbance equals to 0.1.

Figure 6:
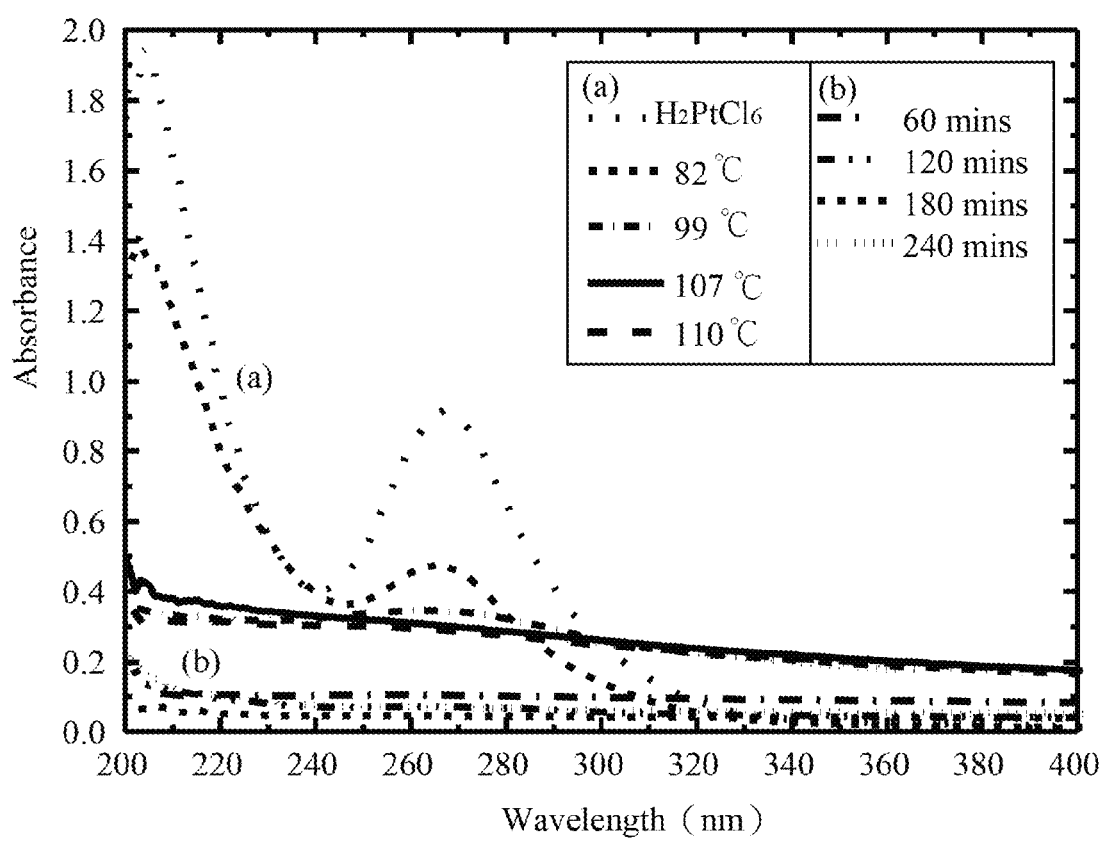
FIG. 6 shows UV/Visible absorption spectra of the polyol reactive solution having pH3.7 under varied temperatures and time, respectively.

Meanwhile, please refer to FIG. 6, which shows UV/Visible absorption spectra of the polyol reactive solution under pH 3.7. In FIG. 6, two parts including part (a) and part (b) are provided. In part (a), it shows UV/Visible absorption spectra of the polyol reactive solution under different temperatures, which are 82° C., 99° C., 107° C. and 110° C., respectively. While in part (b), it shows UV/Visible absorption spectra of the polyol reactive solution at 110° C. under different reaction periods, which are 60 minutes, 120 minutes, 180 minutes and 240 minutes, respectively. From these experimental results provided, it is well proved that the optimum condition for polyol reduction of the present invention is—the polyol solution with pH 3.7 is heated to 110° C. and the reduction maintained at this temperature for 4 fours. To summarize, the kinetics for polyol reduction comprises two stages: (1) forming nanoclusters or nanoparticles when the precursor was heated from normal temperature to 110° C.; and (2) growing crystals when the reduction reaction continues to proceed for 4 hours at the temperature of 110° C.

Figure 7A:
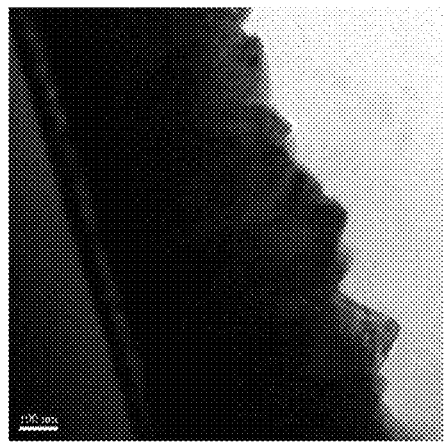
FIGS. 7A-7E show high-resolution transmission electron microscope (HRTEM) images of the SAM-Pt/FTO CE fabricated at different magnifications with one embodiment of the present invention.
Figure 7B:
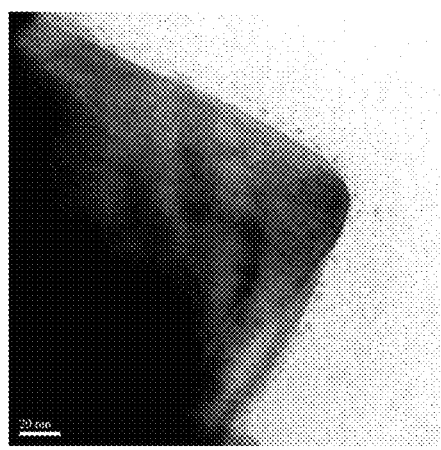
Figure 7C:
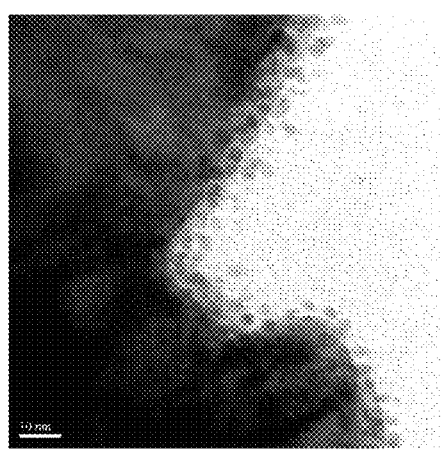
Figure 7D:
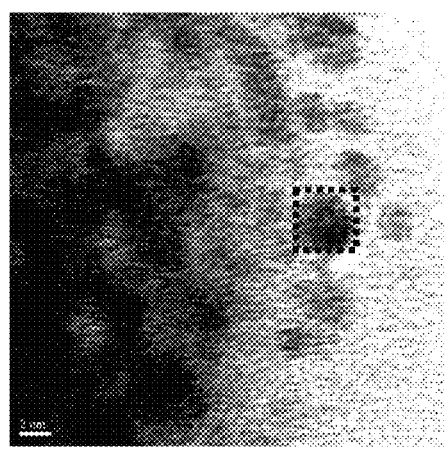
Figure 7E:
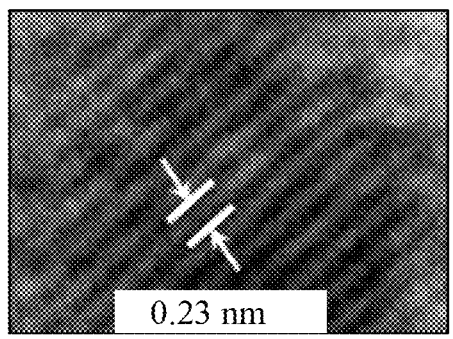

Moreover, in order to prove the formation of a real self-assembled monolayer of Pt NP on TCO surface, the present invention examined the surface morphology of the SAM-Pt/FTO substrate using a high-resolution transmission electron microscope (HRTEM). FIGS. 7A-7E show HRTEM images at different magnifications for the SAM-Pt/FTO CE fabricated according to the approach above-mentioned (pH 3.7). TEM images of the SAM-Pt counter electrodes fabricated under the pH 3.7 condition show a uniform spherical morphology of the Pt nanocrystals self-assembled on rough surface of TCO. The scale bars in FIGS. 7A-7D represent (a) 100 nm, (b) 20 nm, (c) 10 nm and (d) 2 nm, respectively. FIG. 7E with a scale bar 0.2 nm further shows a close look of the dotted area of FIG. 7D. From all these figures showing the (111) facets of Pt lattice, especially FIGS. 7D-7E, it is believed that, the fine structure of the Pt lattice with distance 0.23 nm between the (111) facets is well formed. Moreover, FIG. 7E proves the fine lattice structure of the Pt NP, indicating the distance between the adjacent lattice fringes to be 0.23 nm, which agrees with the interplanar spacing of the {111} facets in the platinum lattice. Since it is reported that Pt(111) plays an important role to affect the catalytic function of IRR through the binding ability of the triiodide species ($I^-/I_3^-$) on the surface of Pt(111), the size of Pt NP is controlled to such a small scale, ~3 nm, that is beneficial to maximize the surface area for great catalytic performance with less Pt loading, as required for commercialization.

Besides, since Pt nanocrystals with greater portions of exposed facet {111}, protective agents or other stabilizers may exhibit enhanced activity and stability for IRR, the clean surfaces of the prepared Pt NP is very critical. According to the SAM approach disclosed above, the manufacturing methods the present invention discloses to fabricate the self-assembled platinum counter electrode have the advantages to produce a pure clean surface thereby preventing the hindrance of the capping agents between Pt atoms and triiodide anions, so as to avoid the hindrance during charge transfer and to effectively enhance the activity for IRR when the SAM-Pt material is used as a CE for DSSC.

Furthermore, an inductively coupled plasma mass spectrometer (ICP-MS) is also used to detect the amount of Pt loading of the present invention, since the Pt loading on the TCO substrate is also an important factor to consider for the future commercialization of DSSC. From the ICP-MS results, it shows the Pt loading in the self-assembled platinum counter electrode of the present invention is very low (especially under the optimum condition, pH=3.7) which saves 20% of the Pt used in comparison with that using the conventional thermal decomposition method. Therefore, the production cost of the present invention can be reduced by one-fifth with respect to the cost using the conventional thermal decomposition method. The excellent device performance of the present invention with a minimum Pt loading also recommends the monolayer-deposited SAM-Pt materials to have a great opportunity as potential CE for commercialization.

Below, a few experimental results are provided to prove the extraordinary photovoltaic and electrochemical performances of the DSSC devices fabricated using platinized counter electrodes of the present invention compared to the prior arts. TD stands for the Pt CE fabricated using the techniques of thermal decomposition; SAM stands for the Pt CE fabricated using the techniques of the present invention; and CED stands for the Pt CE fabricated using the techniques of cyclic electrodeposition.

Please refer to Table 1, which shows photovoltaic and EIS parameters of DSSC devices fabricated with Z907 dye and varied platinized counter electrodes (Pt CE) under TD, SAM, and CED deposited on either a fluorine doped tin oxide (FTO) or an indium tin oxide (ITO) glass substrate, respectively. $J_{SC}$ represents a short-circuit current density; $V_{OC}$ represents an open-circuit voltage; FF represents a fill factor; and η represents efficiencies of power conversion from light to electricity. As shown in Table 1, it proves that, the DSSC devices prepared according to the SAM-Pt method of the present invention attains notable photovoltaic performance (η=9.2%) comparable to those fabricated with a conventional TD method (η=9.1%) or a CED method (η=9.3%) under the same experimental conditions.

TABLE 1

| Counter Electrode | $J_{SC}$/ mA cm$^{-2}$ | $V_{OC}$/ mV | FF | η/ % |
|---|---|---|---|---|
| TD/FTO | 17.2 | 765 | 0.691 | 9.1 |
| SAM/FTO | 17.2 | 770 | 0.682 | 9.0 |
| CED/ITO | 17.1 | 774 | 0.701 | 9.3 |
| SAM/ITO | 17.4 | 764 | 0.691 | 9.2 |

Table 2 shows resistant parameters of electrodes with varied platinized counter electrodes (Pt CE) under TD, SAM, and CED deposited on either a fluorine doped tin oxide (FTO) or an indium tin oxide (ITO) glass substrate, respectively. $R_s$ represents an internal resistance of the cell, which comprises resistance of the conductive substrate and its outer circuit. $R_{ct}$ represents a charge transfer resistance, which is contributed from reduction reaction caused by the triiodide anions at the counter electrode/electrolyte interface. The experimental results of Table 2 prove that either SAM/FTO or SAM/ITO is beneficial to enhance the efficiencies for iodine reduction reaction because $R_{ct}$ of SAM/FTO can be decreased to 3.3 Ω while that of TD/FTO is still up high to 4.0 Ω. Also, a low $R_s$ of SAM/FTO makes it favorable to proceed charge transfer as well. As a result, it is self-evident that SAM/FTO can not only show almost the same catalyst activity as TD/FTO, but also because of its low-temperature process, SAM can be applied to many other ITO materials and flexible substrates too, since these two were believed to be thermally unsustainable and lack of high-temperature endurances. Besides, while compared to CED/ITO, a large Pt loading was required for the CE generated with the CED method. It is obvious that either SAM/FTO or SAM/ITO of the present invention is believed to be able to show great catalytic performance, nevertheless in a less amount of Pt loading, thereby becoming much more competitive and advantageous for cost-effective mass production and commercialization.

TABLE 2

| Counter Electrode[a] | $R_s$/ Ω | $R_{ct}$/ Ω |
|---|---|---|
| TD/FTO | 15.2 | 4.0 |
| SAM/FTO | 14.7 | 3.3 |
| CED/ITO | 10.5 | 2.3 |
| SAM/ITO | 10.7 | 3.7 |

To sum up, the present invention provides a novel method for manufacturing platinum nanoparticle solution and self-assembled platinum counter electrode thereof. According to the embodiment, a polyol reduction method under varied pH conditions to control the rate for the reduction reaction is adopted. Therefore, a platinum nanoparticle dispersion solution with uniformly and homogeneously distributed platinum nanoparticles is fabricated. By simply dip coating a conductive substrate in the solution at normal temperature, the self-assembled platinum nanoparticles are adsorbed on a clean surface of the substrate to form a monolayer of platinum nanoparticles and obtain the self-assembled platinum counter electrode which is capable of superior electro-catalyticability. As a result, the manufacturing method of the present invention is characterized by the following advantages:

(a) Without using any surfactant, a homogeneous reaction can be provided by merely adjusting pH condition of the polyol solution, and the platinum nanoparticles are sized uniformly.

(b) Without using any additional reducing agent, ethylene glycol is provided and used in the polyol approach of the present invention to serve as not only a solvent but also a mild reducing agent to produce the required Pt nanoparticles with uniform size and to precisely control how the polyol reduction proceeds.

(c) Without using additional annealing or post-heating steps, a minimum series resistance and interfacial resistance can be obtained, whereby this approach is not only saving the production cost and time, but also showing better electrochemical characteristics.

(d) A functionalized reaction (e.g. —OH modified or —SH modified) is performed at the surface of the conductive substrate. Therefore, an inlet gas of $O_3$ or other chemical modified process can be adopted, which is beneficial to be widely used in a more variety of substrates.

(e) Since the method of the present invention adopts a low-temperature process, it can be easily applied to various conductive substrates, including ITO which was however, thermally unsustainable, and ITO-PEN/ITO-PET which were known in lack of high-temperature endurance.

(f) Since the uniform SAM-Pt film with a narrow distribution of size and the platinum nanoparticles that scaled only to 3-5 nm can be produced, the uniform nature of the SAM-Pt film has the advantages of minimizing the amounts of Pt loading and optimizing the catalytic function on the substrate surface.

(g) Due to a monolayer of small-size platinum nanoparticles which are adsorbed and uniformly distributed on the surface of the conductive substrate and the self-assembled platinum counter electrode with a homogeneous single layer is formed, the Pt loading in the self-assembled platinum counter electrode of the present invention is minimized. Besides, no subsequent annealing steps need to be used, so the present invention is beneficial to be less cost and time consuming, and thus can be effectively used as a potential CE for DSSC commercialization.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for manufacturing platinum nanoparticle solution, comprising steps of:
    providing a polyol solution composed of $H_2PtCl_6$ and ethylene glycol; and
    heating said polyol solution to 100-120° C. with reduction periods of 2-5 hours, and adjusting pH condition of said polyol solution between 2.7 and 4.9 by adding an NaOH solution so as to obtain said platinum nanoparticle solution.

2. The method for manufacturing platinum nanoparticle solution of claim 1, wherein said polyol solution is formed by uniformly dissolving said $H_2PtCl_6$ in said ethylene glycol.

3. The method for manufacturing platinum nanoparticles solution of claim 1, wherein said polyol solution is heated to 110° C. with said reduction period of 4 hours.

4. The method for manufacturing platinum nanoparticles solution of claim 1, wherein said pH condition of said polyol solution is adjusted to 3.7 by adding said NaOH solution.

5. A method for manufacturing self-assembled platinum counter electrode, comprising steps of:
    providing a conductive substrate and functionalizing said conductive substrate to create a modified surface of said conductive substrate;
    providing a platinum nanoparticle solution, comprising:
        providing a polyol solution composed of $H_2PtCl_6$ and ethylene glycol; and
        heating said polyol solution to 100-120° C. with reduction periods of 2~5 hours, and adjusting pH condition of said polyol solution between 2.7 and 4.9 by adding an NaOH solution so as to obtain said platinum nanoparticle solution; and
    dipping said conductive substrate having said modified surface into said platinum nanoparticles solution to self assemble a monolayer of platinum nanoparticles on said modified surface of said conductive substrate so as to obtain said self-assembled platinum counter electrode.

6. The method for manufacturing self-assembled platinum counter electrode of claim 5, wherein said conductive substrate is a glass substrate or a flexible plastic substrate.

7. The method for manufacturing self-assembled platinum counter electrode of claim 5, wherein said step of functionalizing said conductive substrate further comprising using bifunctional-organosilane compound to activate said conductive substrate such that a functional group comprising —$NH_2$, —SH, —OH or —COOH dominates to create said modified surface of said conductive substrate.

8. The method for manufacturing self-assembled platinum counter electrode of claim 7, further comprising dipping said conductive substrate in a superacid solution so said conductive substrate is covered with active hydroxyl group (—OH) before creating said modified surface of said conductive substrate.

9. The method for manufacturing self-assembled platinum counter electrode of claim 5, wherein said polyol solution is formed by uniformly dissolving said $H_2PtCl_6$ in said ethylene glycol.

10. The method for manufacturing self-assembled platinum counter electrode of claim 5, wherein said polyol solution is heated to 110° C. with said reduction period of 4 hours.

11. The method for manufacturing self-assembled platinum counter electrode of claim 5, wherein said pH condition of said polyol solution is adjusted to 3.7 by adding said NaOH solution.

12. The method for manufacturing self-assembled platinum counter electrode of claim 5, wherein said conductive substrate having said modified surface is dipped into said platinum nanoparticles solution for 8-24 hours.

* * * * *